Oct. 8, 1957  A. G. GLEISSNER  2,809,052
BICYCLE SIDE CARS
Filed Nov. 2, 1954
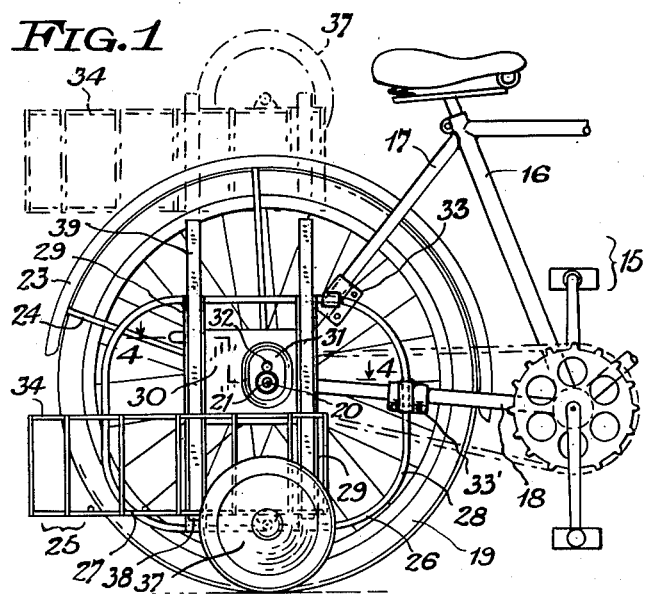
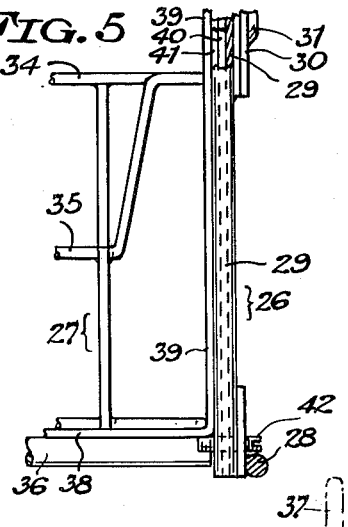
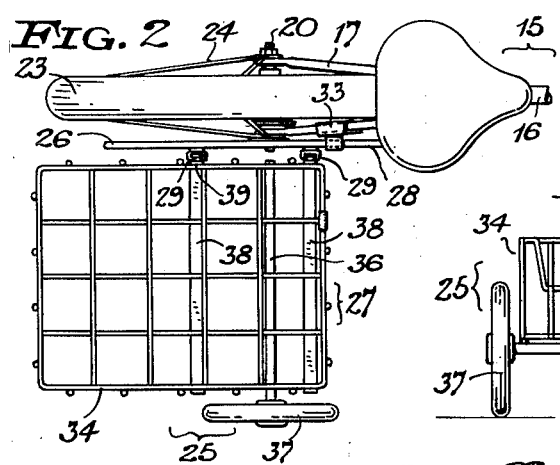
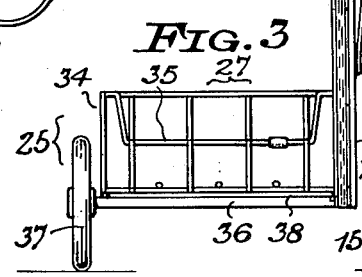
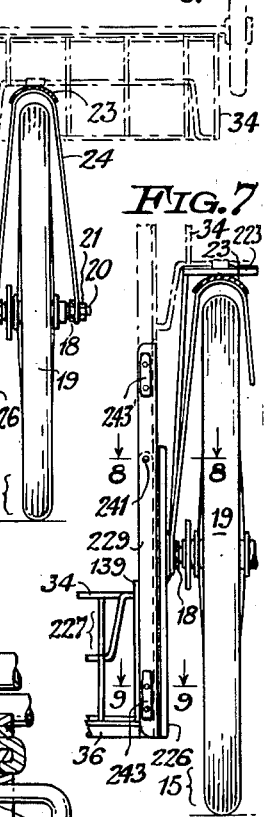
INVENTOR.
ANTON G. GLEISSNER
BY Christopher L. Waal
ATTORNEY United States Patent Office 2,809,052
Patented Oct. 8, 1957

2,809,052

BICYCLE SIDE CARS

Anton G. Gleissner, Milwaukee, Wis.

Application November 2, 1954, Serial No. 466,276

4 Claims. (Cl. 280—203)

The present invention relates to side cars for bicycles, and has for an object to provide an improved bicycle side car which is of strong, durable, light-weight and inexpensive construction, and adapted to carry loads of various kinds, such as newspapers and packages.

Another object is to provide a bicycle side car attachment including a mounting device adapted to be detachably secured to a bicycle and further including a wheeled side car unit which can be quickly attached to and detached from the mounting device.

A further object is to provide a bicycle attachment by which the side car unit when not in use can be supported in an inverted elevated position on the bicycle.

The invention further consists in the several features hereinafter described and claimed.

In the accompanying drawing,

Fig. 1 is a side elevational view of the rear portion of a bicycle having a side car of the invention mounted thereon, an inverted inactive position of the side car being shown in broken lines;

Fig. 2 is a top plan view of the bicycle and attached side car;

Fig. 3 is a front elevational view of the attached side car, parts of the bicycle being shown in section, and an inverted position of the side car being shown in broken lines;

Fig. 4 is a detail sectional view taken generally on the line 4—4 of Fig. 1, showing the interengagement of the side car with a mounting frame;

Fig. 5 is a detail fragmentary front view of the side car, parts being shown in section;

Fig. 6 is a detail transverse sectional view of a modified form of guide bar connection for the side car;

Fig. 7 is a view generally similar to Fig. 3, showing a modified form of side car mounting by which the side car is swingable between its normal and inverted positions;

Fig. 8 is a detail transverse sectional view taken on the line 8—8 of Fig. 7, and Fig. 9 is a detail transverse sectional view taken on the line 9—9 of Fig. 7.

In the drawing, 15 designates a bicycle of conventional construction including a frame 16 with rearwardly converging forks 17 and 18 straddling a rubber-tired rear wheel 19. The wheel is rotatably mounted on a spindle bolt 20 adjustably clamped to the connected ends of the frame forks by the usual nuts 21 and clamping washers 22. The frame forks carry the usual rear wheel fender or mud guard 23 which is supported by stays 24.

The side car attachment of the invention is designated generally by the numeral 25, and is detachably secured to the bicycle as hereinafter described. The attachment comprises a mounting device or frame 26 and a wheeled side car unit or load carrier 27 removably secured thereto. The mounting frame includes a loop-shaped frame member 28 disposed in a vertical plane parallel to the bicycle frame and adjacent to one side, preferably the right side, of the rear portion of the bicycle frame. The frame member 28 consists of a metal rod or tube bent to form a closed loop of generally rectangular shape with rounded corners. Two spaced vertical guide bars 29 of flattened C-shaped cross-section are welded or otherwise secured to the horizontal upper and lower parts of the loop-shaped frame member 28. A vertical mounting plate 30 has its opposite side edges welded to the guide bars and includes a flat-faced embossment 31 projecting toward the bicycle frame and provided with a plurality of vertically spaced openings 32 selectively receiving the projecting end of the rear spindle bolt 20 of the bicycle, the mounting plate being clamped to the bolt by the associated nut 21 and washer 22, Fig. 4. A clamp 33 detachably connects the upper part of the loop-shaped frame member 28 to the adjacent side member of the fork 17 of the bicycle frame, and a similar clamp 33' detachably connects the front vertical part of the frame member 28 with the adjacent side member of the fork 18. The mounting frame is thus firmly mounted on the bicycle frame. However, the loop-shaped frame member 28 is slightly resilient so as to permit a limited flexing of this member.

The side car unit or load carrier 27 includes a rectangular wire basket or receptacle 34 of welded construction, the front wall of the basket preferably having a depressed upper edge 35. An axle 36 is secured below the basket, as by welding, and carries a rubber-tired road wheel 37 at its outer end. Two L-shaped brackets 38 have their horizontal parts extending transversely below the basket and welded to the basket bottom, and have vertical bar portions 39 welded to that side wall of the basket which is adjacent to the mounting frame. The vertical bar portions 39 extend higher than the mounting frame and have welded thereto respective vertical bars 40 of rabbeted cross-section, so as to form composite vertical slide bars each having vertical grooves 41 along its opposite side edges. The slide bars 39, 40, have a slidable frictional interengagement with the channel guide bars 29 of the mounting frame, as best seen in Fig. 4. The slide bars of the side car frame are positioned by stop screws 42, Fig. 5, secured in the lower portions of the guide bars 29, or by one or more latches 43, Fig. 4. Each latch is here shown to comprise a leaf spring 45 secured to the mounting frame plate 30 and carrying a pin or button 44 engageable in an opening 46 in the associated slide bar.

The side car axle 36 extends at right angles to the plane of the rear bicycle wheel and lies in the vertical plane of the spindle bolt 20 for this wheel, so as to permit easy riding and steering of the bicycle when the side car is attached. The side car wheel 37 is of considerably smaller diameter than the bicycle wheel, and the side car basket 27 is placed relatively low with respect to the bicycle frame.

The vertical mounting frame 26, which extends only a short distance from the side of the bicycle frame, normally remains permanently fastened to the bicycle frame and does not interfere with normal riding of the bicycle. The mounting frame is easily attached to the bicycle, and can readily be detached if desired.

When the side car unit 25 is to be used, the slide bars 39, 40, thereof are slid downwardly along the channel guide bars 29 of the mounting frame, the downward displacement of the side car to its proper position being limited by the stop screws 42. The slide bars frictionally hold the side car in its normal position, but may be latched thereto by the spring latches. With the side car attached, the bicycle is ridden and propelled in the usual manner except that it is not banked on turns. However, with a light side car load, the bicycle may be banked on a left-hand turn.

When use of the side car is not required, the side car can be detached from the bicycle by releasing the latch members 43 and lifting the side car upwardly off the channel guide bars of the mounting frame. The side car may be left in detached condition, or it may be carried on the bicycle in an inverted position overhanging the rear portion of the bicycle, as seen in Figs. 1 and 3. For this purpose the bar portions 39 of the slide bars of the inverted side car are slid downwardly into the channel bars 29 until the upper edge 35 of the front wall of the side car basket rests on the mud guard or fender 23 for the rear bicycle wheel. The inverted side car will be frictionally retained in position but may be additionally retained by the latch member 43. The depressed upper edge 35 of the basket front wall permits the inverted basket to straddle the bicycle.

In the modified form of construction shown in Fig. 6, the mounting frame 126 is provided with vertical channel guide bars 129 of C-shaped cross-section similar to the guide bars 29 of Fig. 4. The side car 127 has a basket 34 to which are secured L-shaped brackets 138 each similar to the bracket 38 except for a shortened vertical bar portion 139. Welded or otherwise secured to each vertical bar portion 139 is a vertical slide bar 140 of C-shaped cross-section slidably fitting in the guide bar 129 in both the normal and inverted positions of the side car.

In the modified form of construction shown in Figs. 7 to 9, the side car 227 has a detachable hinged connection with the mounting frame 226, so that the side car may be swung between its normal and inverted positions. The mounting frame 226 is similar to the mounting frame 26 of Fig. 1 except that the vertical channel guide bars 29 of Fig. 1 are replaced by vertical channel bars 229 of U-shaped cross-section, Figs. 8 and 9. The side car 225 of Fig. 7 has a basket 34 to which L-shaped brackets 138 are secured, each bracket having a shortened vertical bar portion 139. To the bar portions 139 are welded or otherwise secured respective vertical channel bars 240 of U-shaped cross-section which fit within the associated channel bars 229 of the mounting frame and have their upper ends pivotally secured thereto by detachable, horizontally extending pivot bolts 241, one being shown in Figs. 7 and 8, which are spaced downwardly from the upper ends of channel bars 229. The horizontal pivot bolts 241 permit swinging movement of the side car in a vertical plane at right angles to the bicycle frame. The side car 227 is releasably retained in its normal position by one or more spring latches 243 similar to the latch 43 of Fig. 4, each latch 243 being secured to a side flange of the channel bar 229 of the mounting frame and being engageable in an opening 246, Fig. 9, in the adjacent flange of the side car channel bar 240. The side car 225 is releasably held in inverted position by a similar latch 243' secured to the upper end portion of the mounting frame channel bar 229. In the inverted position of the side car, the basket 35 thereof may rest either on the mud guard 23, or on a conventional luggage carrier 223 secured above the mud guard.

I claim:

1. A side car attachment for a bicycle having a frame and a rear wheel spindle bolt, comprising a mounting frame having a loop-shaped frame member disposed in a vertical plane and provided with vertically extending bars spaced one behind the other and a mounting plate connecting said bars, said plate being apertured to receive said spindle bolt for attachment thereto, means for attaching said loop-shaped member to the bicycle frame, and a wheeled side car detachably secured to and interfitting with said vertically extending bars.

2. A side car attachment for a bicycle, comprising a support adapted to be secured to a side of the rear portion of a bicycle frame, a wheeled side car having a receptacle-carrying frame including parallel L-shaped brackets spaced one behind the other, the horizontal portions of said brackets extending crosswise of the side car and the vertical portions of said brackets extending upwardly from said side car adjacent said support, and attaching means engaging said vertical bracket portions for selectively securing said side car to said support in upright outboard position and an elevated inverted position overlying the rear wheel of the bicycle.

3. A side car attachment for a bicycle having a rear wheel, comprising a mounting member adapted to be secured to a side of the rear portion of a bicycle frame, a wheeled side car having a pivotal connection with said mounting member to swing about a generally horizontal axis from a normal position to an inverted position overhanging the rear wheel of the bicycle, said horizontal axis being at a higher elevation than the axis of the rear wheel of the bicycle and means for releasably retaining said side car in said positions.

4. A side car attachment for a bicycle having a rear wheel, comprising a mounting member adapted to be secured to a side of the rear portion of the bicycle and including vertically extending bars spaced in a forward and rearward direction, a wheeled side car having vertically extending bars disposed adjacent to said mounting member bars and having their upper end portions pivotally connected to said mounting member bars to swing about a substantially horizontal axis extending transversely of said bars at an elevation higher than the axis of the rear wheel of the bicycle, said side car being swingable about said axis from a normal position to an inverted position overhanging the rear wheel of the bicycle, and means for releasably retaining said side car in said positions.

References Cited in the file of this patent

UNITED STATES PATENTS

| 1,384,300 | Buckland | July 12, 1921 |
| 2,530,498 | Atwood et al. | Nov. 21, 1950 |

FOREIGN PATENTS

| 870,608 | France | Mar. 18, 1942 |
| 219,223 | Great Britain | July 24, 1924 |
| 405,341 | Great Britain | Feb. 5, 1934 |